United States Patent [19]
Kuo et al.

[11] Patent Number: 5,872,204
[45] Date of Patent: Feb. 16, 1999

[54] POLY(1,3-PROPYLENE THEREPHTHALATE)

[75] Inventors: Tung-Ying Kuo; Jih-Chen Huang, both of Hsinchu; Chien-Shiun Liao, Taichung Hsien; I-Min Tseng, Nantou; Chyuan Juang, Hsinchu; Long-Shuen Jean, Chiai Hsien, all of Taiwan

[73] Assignee: Industrial Technology Research Institute, Hsinchu, Taiwan

[21] Appl. No.: 36,096

[22] Filed: Mar. 6, 1998

[30]  Foreign Application Priority Data

Feb. 5, 1998 [TW] Taiwan ................... 87101536

[51] Int. Cl.$^6$ .............. C08G 63/78; C08K 3/02
[52] U.S. Cl. ............. 528/279; 528/279; 528/277; 528/280; 528/285; 528/286; 524/706; 524/710; 524/777; 524/783; 524/785
[58] Field of Search ................... 528/275, 277, 528/279, 280, 285, 286; 524/706, 710, 777, 783, 785

[56]  References Cited

U.S. PATENT DOCUMENTS

| | | | |
|---|---|---|---|
| 4,163,002 | 7/1979 | Pohl et al. | 524/878 |
| 4,937,314 | 6/1990 | Greene | 528/272 |
| 5,340,909 | 8/1994 | Doerr et al. | 528/276 |
| 5,599,900 | 2/1997 | Bhatia | 528/491 |

*Primary Examiner*—Samuel A. Acquah
*Attorney, Agent, or Firm*—Clark & Elbing LLP

[57]  ABSTRACT

The present invention provides a novel poly(1,3-propylene terephthalate), which is prepared from reacting terephthalic acid and 1,3-propanediol in the presence of an effective catalytic amount of ethylene glycol titanate to undergo esterification to form a monomer; and polymerizing the monomer in the presence of an effective catalytic amount of antimony acetate to obtain poly(1,3-propylene terephthalate). The obtained poly(1,3-propylene terephthalate) (PPT) has an intrinsic viscosity (IV) of 0.65–0.91 dl/g, acid number (—COOH amount) of less than 40 meq/kg, and L*>60. Without adding a pigment, the yellowness b* of PPT is below 9, even below 5. The yellowness b* of PPT even reaches below 3 when a pigment is incorporated.

27 Claims, No Drawings

POLY(1,3-PROPYLENE THEREPHTHALATE)

BACKGROUND TO THE INVENTION

1. Field of the Invention

The present invention relates to a novel poly(1,3-propylene terephthalate), and more particularly relates to a novel process for preparing the poly(1,3-propylene terephthalate) by reacting terephthalic acid and 1,3-propanediol in the presence of ethylene glycol titanate as an esterification catalyst and antimony acetate as a polymerization catalyst.

2. Description of the Prior Art

Early in 1941, poly(1,3-propylene terephthalate) (PPT) has been synthesized by Whinfield and Dickson, and it is known that the physical properties of PPT is superior than those of poly(ethylene terephthalate) (PET). At that time, ethylene glycol, which is the starting material of PET, can be commercially prepared, while 1,3-propanediol, which is the starting material of PPT, still can not be commercially prepared. Therefore, PET has first been mass-produced in industry, while PPT has been not. Also, the progress in the techniques for synthesize PPT is limited, and the obtained PPT has an inadequate molecular weight and unacceptable physical properties.

Recently, novel processes for synthesize PPT have been disclosed in Japanese Kokai 51-140298 and U.S. Pat. No. 5,340,909, which focus on improving thermal stability and yellowness, and increasing intrinsic viscosity (IV). However, one is because the monomer used is limited to dimethylene terephthalate (DMT), and the other is because the lowest yellowness b* of the product can only be 9 to 7.5, which reaches below 4 only by the incorporation of pigments; therefore, the results are not satisfactory.

Recently, the techniques for determining structures and physical properties of polymers have progressed greatly, such that we can know the structures and physical properties of PPT for a further extent. Theoretically, since PPT has a larger crystalline structure unit and gauche-gauche molecular conformation than PET, therefore PPT has better bending recovery and the dye molecular will have greater chance to deposit on the PPT crystal. Practically, indeed, experimental results show that the PPT fiber has close bending recovery to nylon 66, and PPT can be dyed at atmospheric pressure without using any dyeing carrier agent. Therefore, if the techniques for synthesizing PPT can be improved and the problems in the conventional process for preparing PPT can be solved, PPT will become a potential commercial polymer for the new century.

SUMMARY OF THE INVENTION

Therefore, the object of the present invention is to solve the above-mentioned problems and to disclose a novel and improved poly(1,3-propylene terephthalate) and the process for preparing it. The present invention utilizes cheaper and commercially-available terephthalic acid as the raw materials. The obtained poly(1,3-propylene terephthalate) has a yellowness (b* value) below 9 and L* value greater than 60 even without adding any dye or pigment, and the intrinsic viscosity (IV) can reach 0.91, which can be utilized to manufacture fibers and engineered plastics.

To achieve the object of the present invention, the poly (1,3-propylene terephthalate) of the present invention is prepared from the following steps of:

(a) reacting terephthalic acid and 1,3-propanediol in the presence of an effective catalytic amount of ethylene glycol titanate to undergo esterification to form a monomer; and (b) polymerizing the monomer in the presence of an effective catalytic amount of antimony acetate to obtain poly(1,3-propylene terephthalate).

Further applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTIONS OF THE INVENTION

Conventionally, dimethylene terephalate (DMT) is used as the starting material for preparing poly(1,3-propylene terephthalate) (PPT). However, DMT is very difficult to attain and is very expensive, thus limiting the production of PPT. The present invention uses terephthalic acid as the starting material, which is easy to attain and is cheaper, thus extensively decreasing the economical cost.

The terephthalic acid used in the present invention preferably has the following properties: acid number is about 675±2, 4CBA (4-carboxybenzaldehyde)≦25 ppm, ash≦15 ppm, metal≦2 ppm, molecular weight is about 166.13 g/mol, and particle size≦75 µ.

The 1,3-propanediol used in the present invention can be attained from commercial products, or can be prepared according to the methods disclosed in U.S. Pat. Nos. 4,873,378; 4,873,379; and 4,935,554. Preferably, the 1,3-propanediol has the following properties: purity>99%, water content<2 wt. %, molecular weight is about 76.10 g/mol, melting point is about −32° C., and boiling point is about 214° C. (at atmospheric pressure).

As to the amount of the monomer reactants, the molar ratio of terephthalic acid to 1,3-propanediol is preferably in the range of 1.0 to 1.5.

The catalyst system used in the present invention is ethylene glycol titanate (tetraethylene titanate) as the esterification catalyst and antimony acetate as the polymerization catalyst. Ethylene glycol titanate is preferably used in an amount of 100 ppm to 250 ppm, and antimony acetate is preferably used in an amount of 100 ppm to 250 ppm, both based on terephthalic acid.

Conventionally, tetrabutyl titanate is used as the esterification catalyst. However, tetrabutyl titanate will react with water that is generated from esterification, thus adversely affecting the catalytic activity. In the present invention, since the esterification catalyst, ethylene glycol titanate, will not react with water, therefore, the catalytic activity will not be affected due to the hydration.

Conventionally, zinc acetate, which is difficult to attain and is very unstable, is used as the polymerization catalyst. In the present invention, easily attained and stable antimony acetate is used as the polymerization catalyst, such that the yellowness (b* value) of the obtained poly(1,3-propylene terephthalate) can be improved. In the case that no dye or pigment is added, the obtained PPT has b* less than 9.

According to the present invention, a polymerization cocatalyst can be added to the polymerization system to make the polymerization undergo easily. Suitable polymerization cocatalysts include cobalt acetate, manganese acetate, magnesium acetate, calcium acetate, and sodium acetate. In the case of cobalt acetate, it is preferably used in an amount of 5 ppm to 50 ppm based on terephthalic acid.

A thermal stabilizer can be added to the polymerization system to improve the thermal stability of the product PPT. Such thermal stabilizers are, for example, trivalent phosphoric acid esters or phosphoric acid salts. Representative examples includes sodium dihydrogen phosphate or triphenyl phosphate. The thermal stabilizer is preferably used in an amount of 10 ppm to 20 ppm based on terephthalic acid.

The esterification of terephthalic acid and 1,3-propanediol preferably occurs at a temperature range from 220° C. to 250° C. and at a pressure range from 1 to 3 atm. The subsequent polymerization preferably occurs at a temperature range from 240° C. to 260° C. and at a vacuum pressure of less than 2.5 torr.

Basically, according to the present invention, by using the catalyst combination of ethylene glycol titanate and antimony acetate, the obtained PPT can have a b* value of less than 9. If the reaction conditions, such as the amount of reactants, reaction temperature, reaction pressure, and vacuum degree, are adjusted, the b* value of PPT can be further lowered, even lower than 5. For example, it has been found by the inventors that during the polymerization under vacuum, if the front section of the vacuum pipe is heated and the rear section is condensed, this will accelerate the removal of the oligomer. Thus, the polymerization time can be shortened and the b* value of PPT can be lowered to less than 5.

As mentioned above, the front section of the vacuum pipe is heated and the rear section is condensed, this means that the temperature in the reaction vessel is higher than that in the vacuum pipe. Specifically, during the polymerization under vacuum, the temperature in the polymerization reaction vessel is kept in the range of 240° C. to 260° C., and the temperature in the vacuum pipe is kept below 200° C., for example, in the range of 140° C. to 160° C.

In order to lower the b* value, a dye or pigment is often incorporated during the preparation of PPT. According to the present invention, the PPT having b* value of less than 9 can be obtained in the case that no dye or pigment is added. Once the reaction conditions are suitably adjusted, PPT having b* value of less than 5 can be obtained. However, in order to further lower the b* value, a dye or pigment can also be added during the esterification or polymerization, such that the b* value can be even lowered to less than 3.

Preferably, the dye or pigment is used in an amount of 1 ppm to 2 ppm based on terephthalic acid. Suitable dye or pigment can be those generally used for decreasing b* value of PPT. Representative examples include some Hostaperm® pigments (manufactured by Hoechst Aktiengesellschaft, such as Hostaperm Pigment Violet 23 and Hostaperm Pigment Blue 15). It has been found by the inventors that with the addition of Santoz Estofil-blue S-RBL and/or Santoz Estofil-red S-GFB, the b* of PPT can be effectively lowered. Preferably, the ratio of the amount added is between 1 and 3 based on weight.

In the conventional process for preparing PPT, no specific boundary is limited for the esterification and polymerization, therefore, the quality of the product is difficult to control. According to the present invention, by defining the esterification ratio to greater than 95.5%, the IV value of the obtained PPT can reach higher than 0.80 dl/g. By defining the polymerization ratio to greater than 99.8% or the recovery of the by-product (such as 1,3-propanediol) to greater than 10%, the IV value of the obtained PPT can fall in the range of 0.65 to 0.91 dl/g.

PPT manufactured in accordance with the present invention can be spun into filament form and then cut into granules. The PPT granules are dried with absolute dry air and then various physical properties of the PPT granules are determined according to the following ways:

(1) Intrinsic viscosity (IV): determined according to ASTM Method D4603-91.

(2) Acid number (—COOH amount): determined according to PV-07013.4 Zimmer Eng. Company, Germany.

(3) Melting point: determined according to JIS Method K7121-1987 by a differential scanning calorimeter (DSC).

(4) Color index: L*, a*, and b* color indices of PPT granules are determined according to ASTM Methods E308-90 and E805-93.

In the following examples, it will be found that the poly(1,3-propylene terephthalate) synthesized from the present invention has the following properties: intrinsic viscosity (IV) is in the range of 0.65 to 0.91 dl/g, acid number (—COOH amount)<40meq/kg, L*>60, b*<9. As mentioned above, if the reaction conditions are properly adjusted, b* value of PPT can be less than 5. If suitable dye or pigment is incorporated, b* value of PPT can even be less than 3.

The following examples are intended to more fully illustrate the process and the advantages of the present invention without limiting its scope, since numerous modifications and variations will be apparent to those skilled in the art.

EXAMPLE 1

A reaction vessel was charged with 249.2 g of terephthalic acid (TPA), 171.2 g of 1,3-propanediol (1,3-PDO), and 50 ppm of ethylene glycol titanate as the esterification catalyst (based on the TPA weight) in sequence. The molar ratio of TPA to 1,3-PDO is 1.5. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 3 kg/cm². Subsequently, with stirring at 65 rpm, the reaction vessel was heated to 227° C. After 3.3 hours, when the water amount that was actually generated reached 96% of the theoretical value, the esterification was terminated.

The pressure was reduced, and the polymerization catalyst (250 ppm of antimony acetate, based on TPA weight) was added with constant stirring at 65 rpm. The reaction vessel was continuously heated to 250° C. and the pressure was gradually reduced to vacuum. After 5 hours of polymerization, the applied voltage of the stirrer reached the highest point. After another 0.5 hours when the highest voltage was maintained flat, the polymerization was terminated, and the final vacuum was about 1.3 torr.

The poly(1,3-propylene terephthalate) product in molten form was extruded into filaments and then cut into granules.

The PPT granules were dried with absolute dry air and tested for various physical properties. The results were: IV=0.8125, acid number=26.37 meq/kg, Tm=226.37° C., L*=77.26, b*=7.80. The reaction conditions and results are shown in Table 1.

EXAMPLE 2

A reaction vessel was charged with 249.2 g of terephthalic acid (TPA), 171.2 g of 1,3-propanediol (1,3-PDO), and 50 ppm of ethylene glycol titanate as the esterification catalyst (based on the TPA weight) in sequence. The molar ratio of TPA to 1,3-PDO is 1.5. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 1 kg/cm². Subsequently, with stirring at 65 rpm, the reaction vessel was heated to 230° C. After 4 hours, when the water amount that was actually generated reached 96% of the theoretical value, the esterification was terminated.

The pressure was reduced. Then, 150 ppm of antimony acetate as the polymerization catalyst and 40 ppm of sodium dihydrogen phosphate (both based on the TPA weight) were added with constant stirring at 65 rpm. The reaction vessel was continuously heated to 260° C. and the pressure was gradually reduced to vacuum. After 3 hours of polymerization, the applied voltage of the stirrer reached the highest point. After another 0.5 hours when the highest voltage was maintained flat, the polymerization was terminated, and the final vacuum was about 2 torr.

The poly(1,3-propylene terephthalate) product in molten form was extruded into filaments and then cut into granules.

The PPT granules were dried with absolute dry air and tested for various physical properties. The results were: IV=0.8253, acid number=24.97 meq/kg, Tm=225.67° C., L*=72.14, b*=8.03. The reaction conditions and results are shown in Table 1.

EXAMPLE 3

A reaction vessel was charged with 249.2 g of terephthalic acid (TPA), 171.2 g of 1,3-propanediol (1,3-PDO), and 200 ppm of ethylene glycol titanate as the esterification catalyst (based on the TPA weight) in sequence. The molar ratio of TPA to 1,3-PDO is 1.5. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 1 kg/cm². Subsequently, with stirring at 65 rpm, the reaction vessel was heated to 240° C. After 3.3 hours, when the water amount that was actually generated reached 96% of the theoretical value, the esterification was terminated.

The pressure was reduced. Then, 150 ppm of antimony acetate as the polymerization catalyst, 40 ppm of cobalt acetate, and 2 ppm of Hostaperm Violet 23 (all based on the TPA weight) were added with constant stirring at 65 rpm. The reaction vessel was continuously heated to 250° C. and the pressure was gradually reduced to vacuum. After 6.5 hours of polymerization, the applied voltage of the stirrer reached the highest point. After another 0.5 hours when the highest voltage was maintained flat, the polymerization was terminated, and the final vacuum was about 1.2 torr.

The poly(1,3-propylene terephthalate) product in molten form was extruded into filaments and then cut into granules.

The PPT granules were dried with absolute dry air and tested for various physical properties. The results were: IV=0.8917, acid number=26.77 meq/kg, Tm=226.98° C., L*=77.69, b*=9.46. The reaction conditions and results are shown in Table 1.

EXAMPLE 4

A reaction vessel was charged with 249.2 g of terephthalic acid (TPA), 171.2 g of 1,3-propanediol (1,3-PDO), and 200 ppm of ethylene glycol titanate as the esterification catalyst (based on the TPA weight) in sequence. The molar ratio of TPA to 1,3-PDO is 1.5. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 1 kg/cm². Subsequently, with stirring at 65 rpm, the reaction vessel was heated to 245° C. After 2.4 hours, when the water amount that was actually generated reached 96% of the theoretical value, the esterification was terminated.

The pressure was reduced. Then, 150 ppm of antimony acetate as the polymerization catalyst and 40 ppm of cobalt acetate (both based on the TPA weight) were added with constant stirring at 65 rpm. The reaction vessel was continuously heated to 250° C. and the pressure was gradually reduced to vacuum. After 2.5 hours of polymerization, the applied voltage of the stirrer reached the highest point. After another 0.5 hours when the highest voltage was maintained flat, the polymerization was terminated, and the final vacuum was about 1.5 torr.

The poly(1,3-propylene terephthalate) product in molten form was extruded into filaments and then cut into granules.

The PPT granules were dried with absolute dry air and tested for various physical properties. The results were: IV=0.8952, acid number=27.90 meq/kg, Tm=227.98° C., L*=74.75, b*=8.56. The reaction conditions and results are shown in Table 1.

EXAMPLE 5

A reaction vessel was charged with 249.2 g of terephthalic acid (TPA), 136.96 g of 1,3-propanediol (1,3-PDO), 50 ppm of ethylene glycol titanate as the esterification catalyst and 40 ppm of cobalt acetate (both based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 2 kg/cm². Subsequently, with stirring at 65 rpm, the reaction vessel was heated to 240° C. After 4.1 hours, when the water amount that was actually generated reached 98% of the theoretical value, the esterification was terminated.

The pressure was reduced, and the polymerization catalyst (150 ppm of antimony acetate, based on the TPA weight) was added with constant stirring at 65 rpm. The reaction vessel was continuously heated to 255° C. and the pressure was gradually reduced to vacuum. After 2.13 hours of polymerization, the applied voltage of the stirrer reached the highest point. After another 0.5 hours when the highest voltage was maintained flat, the polymerization was terminated, and the final vacuum was about 1.3 torr.

The poly(1,3-propylene terephthalate) product in molten form was extruded into microfilaments and then cut into granules.

The PPT granules were dried with absolute dry air and tested for various physical properties. The results were: IV=0.7507, acid number=15.14 meq/kg, Tm=229.34° C., L*=79.50, b*=6.90. The reaction conditions and results are shown in Table 1.

EXAMPLE 6

A reaction vessel was charged with 249.2 g of terephthalic acid (TPA), 136.96 g of 1,3-propanediol (1,3-PDO), and 50 ppm of ethylene glycol titanate as the esterification catalyst (based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 2 kg/cm$^2$. Subsequently, with stirring at 65 rpm, the reaction vessel was heated to 240° C. After 4.8 hours, when the water amount that was actually generated reached 98% of the theoretical value, the esterification was terminated.

The pressure was reduced. Then, 150 ppm of antimony acetate as the polymerization catalyst and 40 ppm of cobalt acetate (both based on the TPA weight) were added with constant stirring at 65 rpm. The reaction vessel was continuously heated to 255° C. and the pressure was gradually reduced to vacuum. After 2.5 hours of polymerization, the applied voltage of the stirrer reached the highest point. After another 0.5 hours when the highest voltage was maintained flat, the polymerization was terminated, and the final vacuum was about 2 torr.

The poly(1,3-propylene terephthalate) product in molten form was extruded into microfilaments and then cut into granules.

The PPT granules were dried with absolute dry air and tested for various physical properties. The results were: IV=0.7989, acid number=13.68 meq/kg, Tm=228.95° C., L*=82.20, b*=5.26. The reaction conditions and results are shown in Table 1.

EXAMPLE 7

A reaction vessel was charged with 249.2 g of terephthalic acid (TPA), 136.96 g of 1,3-propanediol (1,3-PDO), and 100 ppm of ethylene glycol titanate as the esterification catalyst (based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 2 kg/cm$^2$. Subsequently, with stirring at 65 rpm, the reaction vessel was heated to 240° C. After 4.6 hours, when the water amount that was actually generated reached 98% of the theoretical value, the esterification was terminated.

The pressure was reduced. Then, 150 ppm of antimony acetate and 40 ppm of cobalt acetate (both based on the TPA weight) were added with constant stirring at 65 rpm. The reaction vessel was continuously heated to 255° C. and the pressure was gradually reduced to vacuum. After 2.67 hours of polymerization, the applied voltage of the stirrer reached the highest point. After another 0.5 hours when the highest voltage was maintained flat, the polymerization was terminated, and the final vacuum was about 1.7 torr.

The poly (1,3-propylene terephthalate) product in molten form was extruded into microfilaments and then cut into granules.

The PPT granules were dried with absolute dry air and tested for various physical properties. The results were: IV=0.7937, acid number=20.12 meq/kg, Tm=230.87° C., L*=81.45, b*=4.97. The reaction conditions and results are shown in Table 1.

EXAMPLE 8

A reaction vessel was charged with 249.2 g of terephthalic acid (TPA), 136.96 g of 1,3-propanediol (1,3-PDO), and 100 ppm of ethylene glycol titanate as the esterification catalyst (based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 2 kg/cm$^2$. Subsequently, with stirring at 65 rpm, the reaction vessel was heated to 240° C. After 4.8 hours, when the water amount that was actually generated reached 97% of the theoretical value, the esterification was terminated.

The pressure was reduced. Then, 150 ppm of antimony acetate and 40 ppm of cobalt acetate (both based on the TPA weight) were added with constant stirring at 65 rpm. The reaction vessel was continuously heated to 255° C. and the pressure was gradually reduced to vacuum. After 2.5 hours of polymerization, the applied voltage of the stirrer reached the highest point. After another 0.5 hours when the highest voltage was maintained flat, the polymerization was terminated, and the final vacuum was about 1.5 torr.

The poly(1,3-propylene terephthalate) product in molten form was extruded into microfilaments and then cut into granules.

The PPT granules were dried with absolute dry air and tested for various physical properties. The results were: IV=0.8331, acid number=18.87 meq/kg, Tm=228.26° C., L*=70.80, b*=6.14. The reaction conditions and results are shown in Table 1.

EXAMPLE 9

A reaction vessel was charged with 249.2 g of terephthalic acid (TPA), 136.96 g of 1,3-propanediol (1,3-PDO), and 100 ppm of ethylene glycol titanate as the esterification catalyst (based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 2 kg/cm$^2$. Subsequently, with stirring at 65 rpm, the reaction vessel was heated to 240° C. After 5 hours, when the water amount that was actually generated reached 99% of the theoretical value, the esterification was terminated.

The pressure was reduced. Then, 150 ppm of antimony acetate and 40 ppm of cobalt acetate (both based on the TPA weight) were added with constant stirring at 65 rpm. The reaction vessel was continuously heated to 250° C. and the pressure was gradually reduced to vacuum. After 2.7 hours of polymerization, the applied voltage of the stirrer reached the highest point. After another 0.5 hours when the highest voltage was maintained flat, the polymerization was terminated, and the final vacuum was about 1 torr.

The poly(1,3-propylene terephthalate) product in molten form was extruded into microfilaments and then cut into granules.

The PPT granules were dried with absolute dry air and tested for various physical properties. The results were: IV=0.8011, acid number=10.09 meq/kg, Tm=229.06° C., L*=77.19, b*=4.70. The reaction conditions and results are shown in Table 1.

EXAMPLE 10

A reaction vessel was charged with 249.2 g of terephthalic acid (TPA), 136.96 g of 1,3-propanediol (1,3-PDO), and 100 ppm of ethylene glycol titanate as the esterification catalyst (based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 300 mL/min to create a pressure of 2 kg/cm². Subsequently, with stirring at 65 rpm, the reaction vessel was heated to 240° C. After 3.7 hours, when the water amount that was actually generated reached 97% of the theoretical value, the esterification was terminated.

The pressure was reduced. Then, 150 ppm of antimony acetate and 40 ppm of cobalt acetate (both based on the TPA weight) were added with constant stirring at 65 rpm. The reaction vessel was continuously heated to 250° C. and the pressure was gradually reduced to vacuum. After 2.4 hours of polymerization, the applied voltage of the stirrer reached the highest point. After another 0.5 hours when the highest voltage was maintained flat, the polymerization was terminated, and the final vacuum was about 1.7 torr.

The poly(1,3-propylene terephthalate) product in molten form was extruded into microfilaments and then cut into granules.

The PPT granules were dried with absolute dry air and tested for various physical properties. The results were: IV=0.6918, acid number=11.00 meq/kg, Tm=228.84° C., L*=79.10, b*=4.74. The reaction conditions and results are shown in Table 1.

EXAMPLE 11

A reaction vessel was charged with 249.2 g of terephthalic acid (TPA), 136.96 g of 1,3-propanediol (1,3-PDO), and 100 ppm of ethylene glycol titanate as the esterification catalyst (based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 2 kg/cm². Subsequently, with stirring at 80 rpm, the reaction vessel was heated to 240° C. After 3.8 hours, when the water amount that was actually generated reached 98% of the theoretical value, the esterification was terminated.

The pressure was reduced. Then, 150 ppm of antimony and 40 ppm of cobalt acetate (both based on the TPA weight) were added with constant stirring at 50 rpm. The reaction vessel was continuously heated to 250° C. and the pressure was gradually reduced to vacuum. After 2.3 hours of polymerization, the applied voltage of the stirrer reached the highest point. After another 0.5 hours when the highest voltage was maintained flat, the polymerization was terminated, and the final vacuum was about 1.1 torr.

The poly(1,3-propylene terephthalate) product in molten form was extruded into microfilaments and then cut into granules.

The PPT granules were dried with absolute dry air and tested for various physical properties. The results were: IV=0.6438, acid number=17.81 meq/kg, Tm=229.14° C., L*=70.36, b*=4.19. The reaction conditions and results are shown in Table 1.

EXAMPLE 12

A reaction vessel was charged with 249.2 g of terephthalic acid (TPA), 136.96 g of 1,3-propanediol (1,3-PDO), and 100 ppm of ethylene glycol titanate as the esterification catalyst (based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 200 mL/min to create a pressure of 2 kg/cm². Subsequently, with stirring at 80 rpm, the reaction vessel was heated to 242° C. After 2.9 hours, when the water amount that was actually generated reached 99% of the theoretical value, the esterification was terminated.

The pressure was reduced. Then, 150 ppm of antimony acetate and 40 ppm of cobalt acetate (both based on the TPA weight) were added with constant stirring at 50 rpm. The reaction vessel was continuously heated to 255° C. and the pressure was gradually reduced to vacuum. After 4.5 hours of polymerization, the applied voltage of the stirrer reached the highest point. After another 0.5 hours when the highest voltage was maintained flat, the polymerization was terminated, and the final vacuum was about 1.0 torr.

The poly(1,3-propylene terephthalate) product in molten form was extruded into microfilaments and then cut into granules.

The PPT granules were dried with absolute dry air and tested for various physical properties. The results were: IV=0.9133, acid number=13.59 meq/kg, Tm=228.55° C., L*=77.23, b*=5.56. The reaction conditions and results are shown in Table 1.

EXAMPLE 13

A reaction vessel was charged with 249.2 g of terephthalic acid (TPA), 136.96 g of 1,3-propanediol (1,3-PDO) containing ⅓ ppm of Santoz Estofil-blue SRBL and ⅔ ppm of Santoz Estofil-red GFB, and 100 ppm of ethylene glycol titanate (all based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 2 kg/cm². Subsequently, with stirring at 80 rpm, the reaction vessel was heated to 242° C. After 3.8 hours, when the water amount that was actually generated reached 99% of the theoretical value, the esterification was terminated.

The pressure was reduced. Then, 150 ppm of antimony acetate as the polymerization catalyst and 40 ppm of cobalt acetate (both based on the TPA weight) were added with constant stirring at 50 rpm. The reaction vessel was continuously heated to 250° C. and the pressure was reduced to vacuum, while the vacuum pipe was kept at about 150° C. After 2.5 hours of polymerization, the applied voltage of the stirrer reached the highest point. After another 0.5 hours when the highest voltage was maintained flat, the polymerization was terminated, and the final vacuum was about 1.3 torr.

The poly(1,3-propylene terephthalate) product in molten form was extruded into microfilaments and then cut into granules.

The PPT granules were dried with absolute dry air and tested for various physical properties. The results were: IV=0.7870, acid number=16.11 meq/kg, Tm=226.47° C., L*=78.41, b*=2.49. The reaction conditions and results are shown in Table 1.

EXAMPLE 14

A reaction vessel was charged with 249.2 g of terephthalic acid (TPA), 136.96 g of 1,3-propanediol (1,3-PDO) containing ⅓ ppm of Santoz Estfil-blue SRBL and ⅔ ppm of Santoz Estfil-red GFB, and 100 ppm of ethylene glycol titanate (all based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 2 kg/cm$^2$. Subsequently, with stirring at 80 rpm, the reaction vessel was heated to 242° C. After 3.2 hours, when the water amount that was actually generated reached 99% of the theoretical value, the esterification was terminated.

The pressure was reduced. Then, 150 ppm of antimony acetate as the polymerization catalyst, 40 ppm of cobalt acetate, and 16 ppm of triphenyl phosphate (all based on the TPA weight) were added with constant stirring at 65 rpm. The reaction vessel was continuously heated to 250° C. and the pressure was reduced to vacuum, while the vacuum pipe was kept at about 150° C. After 2.8 hours of polymerization, the applied voltage of the stirrer reached the highest point. After another 0.5 hours when the highest voltage was maintained flat, the polymerization was terminated, and the final vacuum was about 1.1 torr.

The poly(1,3-propylene terephthalate) product in molten form was extruded into microfilaments and then cut into granules.

The PPT granules were dried with absolute dry air and tested for various physical properties. The results were: IV=0.7618, acid number=14.07 meq/kg, Tm=227.46° C., L*=80.13, b*=3.24. The reaction conditions and results are shown in Table 1.

EXAMPLE 15

A reaction vessel was charged with 249.2 g of terephthalic acid (TPA), 136.96 g of 1,3-propanediol (1,3-PDO) containing ⅓ ppm of Santoz Estfil-blue SRBL and ⅔ ppm of Santoz Estfil-red GFB, and 100 ppm of ethylene glycol titanate (all based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 100 mL/min to create a pressure of 2 kg/cm$^2$. Subsequently, with stirring at 65 rpm, the reaction vessel was heated to 242° C. After 2.7 hours, when the water amount that was actually generated reached 99% of the theoretical value, the esterification was terminated.

The pressure was reduced. Then, 150 ppm of antimony acetate as the polymerization catalyst, 40 ppm of cobalt acetate, and 16 ppm of triphenyl phosphate (all based on the TPA weight) were added with constant stirring at 50 rpm. The reaction vessel was continuously heated to 250° C. and the pressure was reduced to vacuum, while the vacuum pipe was kept at about 150° C. After 2.9 hours of polymerization, the applied voltage of the stirrer reached the highest point. After another 0.5 hours when the highest voltage was maintained flat, the polymerization was terminated, and the final vacuum was about 1.0 torr.

The poly(1,3-propylene terephthalate) product in molten form was extruded into microfilaments and then cut into granules.

The PPT granules were dried with absolute dry air and tested for various physical properties. The results were: IV=0.8210, acid number=15.44 meq/kg, Tm=227.20° C., L*=81.06, b*=3.49. The reaction conditions and results are shown in Table 1.

EXAMPLE 16

A reaction vessel was charged with 249.2 g of terephthalic acid (TPA), 136.96 g of 1,3-propanediol (1,3-PDO), and 100 ppm of ethylene glycol titanate (based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 200 mL/min to create a pressure of 2 kg/cm$^2$. Subsequently, with stirring at 80 rpm, the reaction vessel was heated to 242° C. After 5.1 hours, when the water amount that was actually generated reached 99% of the theoretical value, the esterification was terminated.

The pressure was reduced. Then, 150 ppm of antimony acetate as the polymerization catalyst, 40 ppm of cobalt acetate, and 16 ppm of triphenyl phosphate (all based on the TPA weight) were added with constant stirring at 50 rpm. The reaction vessel was continuously heated to 250° C. and the pressure was gradually reduced to vacuum. After 2.5 hours of polymerization, the applied voltage of the stirrer reached the highest point. After another 0.5 hours when the highest voltage was maintained flat, the polymerization was terminated, and the final vacuum was about 0.89 torr.

The poly(1,3-propylene terephthalate) product in molten form was extruded into microfilaments and then cut into granules.

The PPT granules were dried with absolute dry air and tested for various physical properties. The results were: IV=0.8103, acid number=12.09 meq/kg, Tm=227.94° C., L*=73.83, b*=8.12. The reaction conditions and results are shown in Table 1.

Comparative Example 1

A 50 L of reaction vessel was charged with 6.85 kg of terephthalic acid (TPA), 12.5 kg of 1,3-propanediol (1,3-PDO), and 100 ppm of ethylene glycol titanate (based on the TPA weight) in sequence. The molar ratio of TPA to 1,3-PDO is 1.2. The contents of the vessel was agitated slowly with a stirrer to assure homogenous mixing of the raw materials and purged with nitrogen having a flow rate of 200 mL/min to remove the residual air. The reaction vessel was then purged with nitrogen having a flow rate of 200 mL/min to create a pressure of 2 kg/cm$^2$. Subsequently, with stirring at 66 rpm, the reaction vessel was heated from 179° C. to 240° C. During the heating, the water generated from esterification was removed by the distillation tower. After 3 hours, since the water outlet of the distillation tower was not kept heating, the temperature on the tower top was always below 135° C. The removal of the water amount that was actually generated can only reach 50% of the theoretical value, indicating that the esterification was not complete. This is because the water generated from the esterification flowed back into the reaction vessel, and tetrabutyl titanate reacted with the water, thus the catalytic activity was adversely affected.

TABLE 1

| Exp. | TPA (g) | 1,3-PDO (g) | TPA/1,3-PDO (mole ratio) | tetraethylene acetate (ppm) | pressure (kg/cm$^2$) | temperature (°C.) |
|---|---|---|---|---|---|---|
| | | | Conditions for Esterification | | | |
| 1 | 249.2 | 171.2 | 1.5 | 50 | 3 | 227 |
| 2 | 249.2 | 171.2 | 1.5 | 50 | 1 | 230 |
| 3 | 249.2 | 171.2 | 1.5 | 200 | 1 | 240 |
| 4 | 249.2 | 171.2 | 1.5 | 200 | 1 | 245 |
| 5 | 249.2 | 136.9 | 1.2 | 50 | 2 | 240 |
| 6 | 249.2 | 136.9 | 1.2 | 50 | 2 | 240 |
| 7 | 249.2 | 136.9 | 1.2 | 100 | 2 | 240 |
| 8 | 249.2 | 136.9 | 1.2 | 100 | 2 | 240 |
| 9 | 249.2 | 136.9 | 1.2 | 100 | 2 | 242 |
| 10 | 249.2 | 136.9 | 1.2 | 100 | 2 | 242 |
| 11 | 249.2 | 136.9 | 1.2 | 100 | 2 | 242 |
| 12 | 249.2 | 136.9 | 1.2 | 100 | 2 | 242 |
| 13 | 249.2 | 136.9 | 1.2 | 100 | 2 | 242 |
| 14 | 249.2 | 136.9 | 1.2 | 100 | 2 | 242 |
| 15 | 249.2 | 136.9 | 1.2 | 100 | 2 | 242 |
| 16 | 249.2 | 136.9 | 1.2 | 100 | 2 | 242 |

| Exp. | antimony acetate (ppm) | cobalt acetate (ppm) | sodium dihydrogen phosphate (ppm) | triphenyl phosphate (ppm) | temperature (°C.) | vacuum degree (torr) | Hostaperm Violet 23 (ppm) | Santoz Estofil-blue SRB (ppm) | Santoz Estofil-red GFB (ppm) | intrinsic viscosity (IV) | yellowness (b*) |
|---|---|---|---|---|---|---|---|---|---|---|---|
| | | | Conditions for Polymerization | | | | | | | Physical Properties of PPT | |
| 1 | 250 | | | | 250 | 1.3 | | | | 0.8125 | 7.80 |
| 2 | 150 | | 40 | | 260 | 2 | | | | 0.8253 | 8.03 |
| 3 | 150 | 40 | | | 250 | 1.2 | 2 | | | 0.8917 | 9.46 |
| 4 | 150 | 40 | | | 250 | 1.5 | | | | 0.8952 | 8.56 |
| 5 | 255 | *40 | | | 255 | 1.3 | | | | 0.7507 | 6.90 |
| 6 | 255 | 40 | | | 255 | 2 | | | | 0.7989 | 5.26 |
| 7 | 255 | 40 | | | 255 | 1.7 | | | | 0.7937 | 4.97 |
| 8 | 255 | 40 | | | 255 | 1.5 | | | | 0.8331 | 6.14 |
| 9 | 250 | 40 | | | 251 | 1.0 | | | | 0.8011 | 4.70 |
| 10 | 250 | 40 | | | 250 | 1.7 | | | | 0.6908 | 4.74 |
| 11 | 250 | 40 | | | 250 | 1.1 | | | | 0.6438 | 4.19 |
| 12 | 255 | 40 | | | 250 | 1.0 | | | | 0.9133 | 5.56 |
| 13 | 250 | 40 | | | 250 | 1.3 | | 4/3 | 2/3 | 0.7870 | 2.49 |
| 14 | 250 | 40 | | 16 | 250 | 1.1 | | 4/3 | 2/3 | 0.7618 | 3.24 |
| 15 | 250 | 40 | | 16 | 260 | 1.0 | | 4/3 | 2/3 | 0.8210 | 3.49 |
| 16 | 250 | 40 | | 16 | 265 | 0.89 | | | | 0.8103 | 8.12 |

*cobalt acetate was added during the esterification

From the results of the above examples, it can be seen that by using the catalyst combination of ethylene glycol titanate and antimony acetate, PPT having b* value lower than 9 can be obtained even no dye or pigment is added. If the reaction conditions, such as the amount of reactants, reaction temperature, reaction pressure, and vacuum degree, are properly adjusted, the b* value of PPT can be further lowered, even lower than 5 (see Examples 7, 9, 10, and 11). As to Examples 13–15, without adding any pigment, during the polymerization under vacuum, if the front section of the vacuum pipe is heated and the rear section is condensed, this will accelerate the removal of the oligomer. Thus, the polymerization time can be shortened and the b* value of PPT can be further lowered, even to 2.49 (see Example 13).

In conclusion, the features and advantages of the present invention can be summarized below.

(1) The present invention utilizes terephthalic acid as the raw materials, which is cheaper and easier to attain than dimethylene terephthalate. Therefore, the economical cost can be extensively saved.

(2) The present invention utilizes ethylene glycol titanate as the esterification catalyst. This can prevent the hydration reaction between the catalyst and water, thus the catalyst activity will not be affected.

(3) The present invention utilizes antimony acetate as the polymerization catalyst, which is easy to attain and very stable. Such that, the yellowness (b* value) of the obtained poly(1,3-propylene terephthalate) can be improved to less than 9.

(4) According to the present invention, the polymerization is conducted under vacuum. If the front section of the vacuum pipe is heated and the rear section is condensed, this will accelerate the removal of the oligomer. Thus, the polymerization time can be shortened and the b* value of PPT can be lowered to less than 5.

(5) According to the present invention, the esterification ratio is limited to larger than 95.5%. This facilitates increasing the IV value of the obtained PPT to at least 0.80.

(6) According to the present invention, the polymerization ratio is limited to larger than 99.8% or the recovery of the by-product is limited to larger than 10%. This facilitates increasing the IV value of the obtained PPT to the range of 0.65 to 0.91.

What is claimed is:

1. A poly(1,3-propylene terephthalate) which is prepared from the following steps of:

(a) reacting terephthalic acid and 1,3-propanediol in the presence of an effective catalytic amount of ethylene glycol titanate to undergo esterification to form a monomer; and (b) polymerizing the monomer in the presence of an effective catalytic amount of antimony acetate to obtain poly(1,3-propylene terephthalate).

2. The poly(1,3-propylene terephthalate) as claimed in claim 1, wherein in step (a), the molar ratio of terephthalic acid to 1,3-propanediol is in the range of 1.0 to 1.5.

3. The poly(1,3-propylene terephthalate) as claimed in claim 1, wherein ethylene glycol titanate is present in an amount of 100 ppm to 250 ppm based on terephthalic acid.

4. The poly(1,3-propylene terephthalate) as claimed in claim 1, wherein antimony acetate is present in an amount of 100 ppm to 250 ppm based on terephthalic acid.

5. The poly(1,3-propylene terephthalate) as claimed in claim 1, wherein in step (b), the polymerization is conducted in the presence of a polymerization cocatalyst.

6. The poly(1,3-propylene terephthalate) as claimed in claim 5, wherein the polymerization cocatalyst is selected from the group consisting of cobalt acetate, manganese acetate, magnesium acetate, calcium acetate, and sodium acetate.

7. The poly(1,3-propylene terephthalate) as claimed in claim 6, wherein the polymerization cocatalyst is cobalt acetate.

8. The poly(1,3-propylene terephthalate) as claimed in claim 7, wherein cobalt acetate is present in an amount of 5 ppm to 50 ppm based on terephthalic acid.

9. The poly(1,3-propylene terephthalate) as claimed in claim 1, wherein in step (b), the polymerization is conducted in the presence of a thermal stabilizer.

10. The poly(1,3-propylene terephthalate) as claimed in claim 9, wherein the thermal stabilizer is a trivalent phosphoric acid ester or phosphoric acid salt.

11. The poly(1,3-propylene terephthalate) as claimed in claim 10, wherein the thermal stabilizer is sodium dihydrogen phosphate or triphenyl phosphate.

12. The poly(1,3-propylene terephthalate) as claimed in claim 11, wherein the thermal stabilizer is present in an amount of 10 ppm to 20 ppm based on terephthalic acid.

13. The poly(1,3-propylene terephthalate) as claimed in claim 1, wherein in step (a) or (b), a pigment or dye is present.

14. The poly(1,3-propylene terephthalate) as claimed in claim 13, wherein the pigment or dye is present in an amount of 1 ppm to 2 ppm based on terephthalic acid.

15. The poly(1,3-propylene terephthalate) as claimed in claim 1, wherein the esterification in step (a) occurs at a temperature range of from 220° C. to 250° C. and at a pressure range of 1 to 3 atm.

16. The poly(1,3-propylene terephthalate) as claimed in claim 1, wherein the polymerization in step (b) occurs at a temperature range of from 240° C. to 260° C. and at a vacuum pressure of less than 2.5 torr.

17. The poly(1,3-propylene terephthalate) as claimed in claim 16, wherein the polymerization under vacuum in step (b) is conducted in a reaction vessel and the pressure is reduced from a vacuum pipe, the temperature in the vacuum pipe being lower than the temperature in the reaction vessel.

18. The poly(1,3-propylene terephthalate) as claimed in claim 17, wherein the temperature in the reaction vessel is kept in the range of 240° C. to 260° C. and the temperature in the vacuum pipe is kept below 200° C.

19. The poly(1,3-propylene terephthalate) as claimed in claim 18, wherein the temperature in the vacuum pipe is kept in the range of 140° C. to 160° C.

20. The poly(1,3-propylene terephthalate) as claimed in claim 1, wherein the esterification ratio in step (a) is greater than 95.5%.

21. The poly(1,3-propylene terephthalate) as claimed in claim 1, wherein the polymerization ratio in step (b) is greater than 99.8%.

22. The poly(1,3-propylene terephthalate) as claimed in claim 1, wherein after step (b), a by-product of 1,3-propanediol can be recovered to greater than 10%.

23. The poly(1,3-propylene terephthalate) as claimed in claim 1, which has the following properties: 0.65 to 0.91 dl/g of intrinsic viscosity, less than 40 meq/kg of acid number (—COOH amount), $L^*>60$, and $b^*<9$.

24. The poly(1,3-propylene terephthalate) as claimed in claim 23, which has yellowness $b^*$ less than 5.

25. The poly(1,3-propylene terephthalate) as claimed in claim 13, which has the following properties: 0.65 to 0.91 dl/g of intrinsic viscosity, less than 40 meq/kg of acid number (—COOH amount), $L^*>60$, and $b^*<3$.

26. The poly(1,3-propylene terephthalate) as claimed in claim 17, which has the following properties: 0.65 to 0.91 dl/g of intrinsic viscosity, less than 40 meq/kg of acid number (—COOH amount), $L^*>60$, and $b^*<5$.

27. A process for preparing poly(1,3-propylene terephthalate), comprising the following steps of:
   (a) reacting terephthalic acid and 1,3-propanediol in the presence of an effective catalytic amount of ethylene glycol titanate to undergo esterification to form a monomer; and
   (b) polymerizing the monomer in the presence of an effective catalytic amount of antimony acetate to obtain poly(1,3-propylene terephthalate).

* * * * *